United States Patent
Shiwaku et al.

(10) Patent No.: US 7,972,104 B2
(45) Date of Patent: Jul. 5, 2011

(54) OVERHEAD TRAVELING VEHICLE SYSTEM

(75) Inventors: Tamotsu Shiwaku, Kani (JP); Takashi Nakao, Neyagawa (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 1021 days.

(21) Appl. No.: 11/392,548

(22) Filed: Mar. 30, 2006

(65) Prior Publication Data
US 2006/0222479 A1 Oct. 5, 2006

(30) Foreign Application Priority Data
Mar. 31, 2005 (JP) .................................. 2005-102660

(51) Int. Cl.
*B65G 65/00* (2006.01)
(52) U.S. Cl. .................... 414/282; 212/331; 414/626
(58) Field of Classification Search .................. 414/413, 414/626, 411, 274, 217, 331.03, 267, 268, 414/282; 700/213; 212/329, 330, 331, 332
See application file for complete search history.

(56) References Cited

U.S. PATENT DOCUMENTS

| | | | | |
|---|---|---|---|---|
| 5,669,748 A * | 9/1997 | Knudsen, Jr. | | 414/273 |
| 5,980,183 A * | 11/1999 | Fosnight | | 414/222.01 |
| 6,183,184 B1 * | 2/2001 | Shiwaku | | 414/281 |
| 6,315,513 B1 * | 11/2001 | Harukawa et al. | | 414/286 |
| 6,443,400 B2 * | 9/2002 | Murata et al. | | 246/1 R |
| 6,679,369 B2 * | 1/2004 | Okuyama | | 198/346.1 |
| 6,721,627 B2 * | 4/2004 | Udou et al. | | 700/228 |
| 6,745,102 B1 * | 6/2004 | Liu | | 700/228 |
| 6,758,647 B2 * | 7/2004 | Kaji et al. | | 414/217 |
| 6,779,760 B2 * | 8/2004 | Chang et al. | | 246/1 C |
| 6,799,521 B2 * | 10/2004 | Tai et al. | | 104/88.01 |
| 7,477,963 B2 * | 1/2009 | Hori et al. | | 700/214 |
| 2003/0185655 A1 * | 10/2003 | Uchimaki et al. | | 414/217 |
| 2004/0109746 A1 * | 6/2004 | Suzuki | | 414/373 |
| 2004/0126208 A1 * | 7/2004 | Tawyer et al. | | 414/222.02 |
| 2004/0149672 A1 * | 8/2004 | Motoori et al. | | 212/332 |
| 2005/0150416 A1 * | 7/2005 | Hori et al. | | 105/49 |
| 2006/0051188 A1 * | 3/2006 | Hoshino | | 414/277 |
| 2006/0051192 A1 * | 3/2006 | Fujiki | | 414/626 |
| 2006/0182553 A1 * | 8/2006 | Yamamoto et al. | | 414/278 |

FOREIGN PATENT DOCUMENTS

| | | |
|---|---|---|
| JP | 3067656 | 4/1998 |
| JP | 10-250835 A | 9/1998 |
| JP | 2004-189018 A | 7/2004 |
| JP | 2004-189361 A | 7/2004 |

OTHER PUBLICATIONS

Japanese Notification of Reason(s) for Refusal dated Mar. 10, 2008, issued in corresponding Japanese Patent Application No. 2005-102660.
Japanese Office Action dated Jun. 23, 2008, issued in corresponding Japanese Patent Application No. 2005-102660.

* cited by examiner

*Primary Examiner* — Saúl J Rodriguez
*Assistant Examiner* — Glenn Myers
(74) *Attorney, Agent, or Firm* — Westerman, Hattori, Daniel & Adrian, LLP

(57) ABSTRACT

A lower buffer 6 is placed under a traveling rail for an overhead traveling vehicle 16, and a side buffer 8 is provided on a side of the traveling rail. The overhead traveling vehicle 16 has a hoisting frame 30, and a lateral feeding unit 24 for laterally feeding the hoisting frame 30.

5 Claims, 4 Drawing Sheets

OVERHEAD TRAVELING VEHICLE SYSTEM

TECHNICAL FIELD

The present invention relates to an overhead traveling vehicle system. In particular, the present invention relates to improvement in storage capacity for articles.

BACKGROUND ART

In Japanese Patent No. 3067656, the applicant proposed temporal storage of articles by providing a buffer between load ports in an overhead traveling vehicle system. For example, the buffer is supported by suspending the buffer from a traveling rail. Thereafter, the applicant focused on further shortage of temporal storage capacity created only by the buffer between the load ports, and achieved the present invention.

SUMMARY OF THE INVENTION

A primary object of the present invention is to efficiently utilize an overhead space for making it possible to store more articles.

A secondary object of the present invention is to make it possible to store an article without obstructing transfer of the article to/from a load port.

Still a secondary object of the present invention is to make it possible to swiftly assign the next transportation command to an overhead traveling vehicle when a load port at an unloading point is occupied, and to make it possible to unload the article on the load port when the load port becomes empty.

According to the present invention, an overhead traveling vehicle system includes a traveling rail for an overhead traveling vehicle in an overhead space, and a load port for a processing apparatus in a ground space under the overhead space. A hoisting frame is elevated and lowered by an elevation drive unit of the overhead traveling vehicle for transferring an article stored on the hoisting frame. A first article rack is provided in the overhead space under the traveling rail, and a second article rack is provided in the overhead space on a side of the traveling rail. The overhead traveling vehicle is provided with lateral feeding means for laterally feeding the elevation drive unit and the hoisting frame to the side of traveling rail. The article is transferred between the hoisting frame and the first article rack by elevating and lowering the hoisting frame. The article is transferred between the hoisting frame and the second article rack by laterally feeding, elevating, and lowering the hoisting frame.

It is preferable that the first article rack is provided in a segment where no load port is present.

In particular, it is preferable that the overhead traveling vehicle system further comprises means: for temporarily placing an article, which cannot be unloaded on the load port, on the first article rack on an upstream side of the load port; for memorizing a position of the temporarily placed article; and for controlling a subsequent overhead traveling vehicle to transport the article on the first article rack to the load port when unloading of the article on the load port becomes possible.

In the case where the lateral feeding means comprises a double speed mechanism, if a lateral movement member of the double speed mechanism is laterally fed by a predetermined stroke, the elevation drive unit is fed laterally by an amount twice as much as the predetermined stroke. Thus, the stroke for laterally feeding the article with respect to the left-right width, i.e., the lateral width of the overhead traveling vehicle becomes large.

It is preferable that the overhead traveling vehicle further comprises a first sensor for detecting a previously stored article on the first article rack, and a second sensor for detecting a previously stored article on the second article rack. In the structure, the overhead traveling vehicle can instantly confirm whether the article rack is empty, or occupied by the article.

Further, it is preferable that a transmission unit such as an RFID which is capable of rewritably outputting states of the first and second article racks is provided along the traveling rail, and the overhead traveling vehicle has a reader for reading the output from the transmission unit. In the structure, the overhead traveling vehicle can transfer the article to/from the respective article rack according to an output signal from the transmission unit.

In the present invention, since the first article rack and the second article rack are provided in the overhead space, the storage capacity for the articles is improved. Thus, stockers for temporal storage of the articles become unnecessary, or it is possible to reduce the number of the stockers. For example, if the stockers or the like at the border between an inter-bay route and an intra-bay route become unnecessary, the intra-bay route and the inter-bay route may be directly connected. Thus, it becomes easy to establish the system for directly transporting the article between the bays. Further, by using the racks as buffers, transportation operation can be performed more freely, and improvement in transportation efficiency is achieved.

In the case where the first article rack is provided in a segment where no load port is provided, when the article is stored, the first article rack does not obstruct the transfer of the article between the load port and the overhead traveling vehicle.

Preferably, in the case where the load port is occupied, and there is any article which cannot be unloaded, the article is temporarily placed on the first article rack on the upstream side, and the overhead traveling vehicle which has transported the article is released from the transportation operation. When it becomes possible to unload the article on the load port, the temporarily placed article can be transported to the load port by the subsequent overhead traveling vehicle. Thus, operation of the vehicle traveling system is carried out efficiently.

Figure 1:
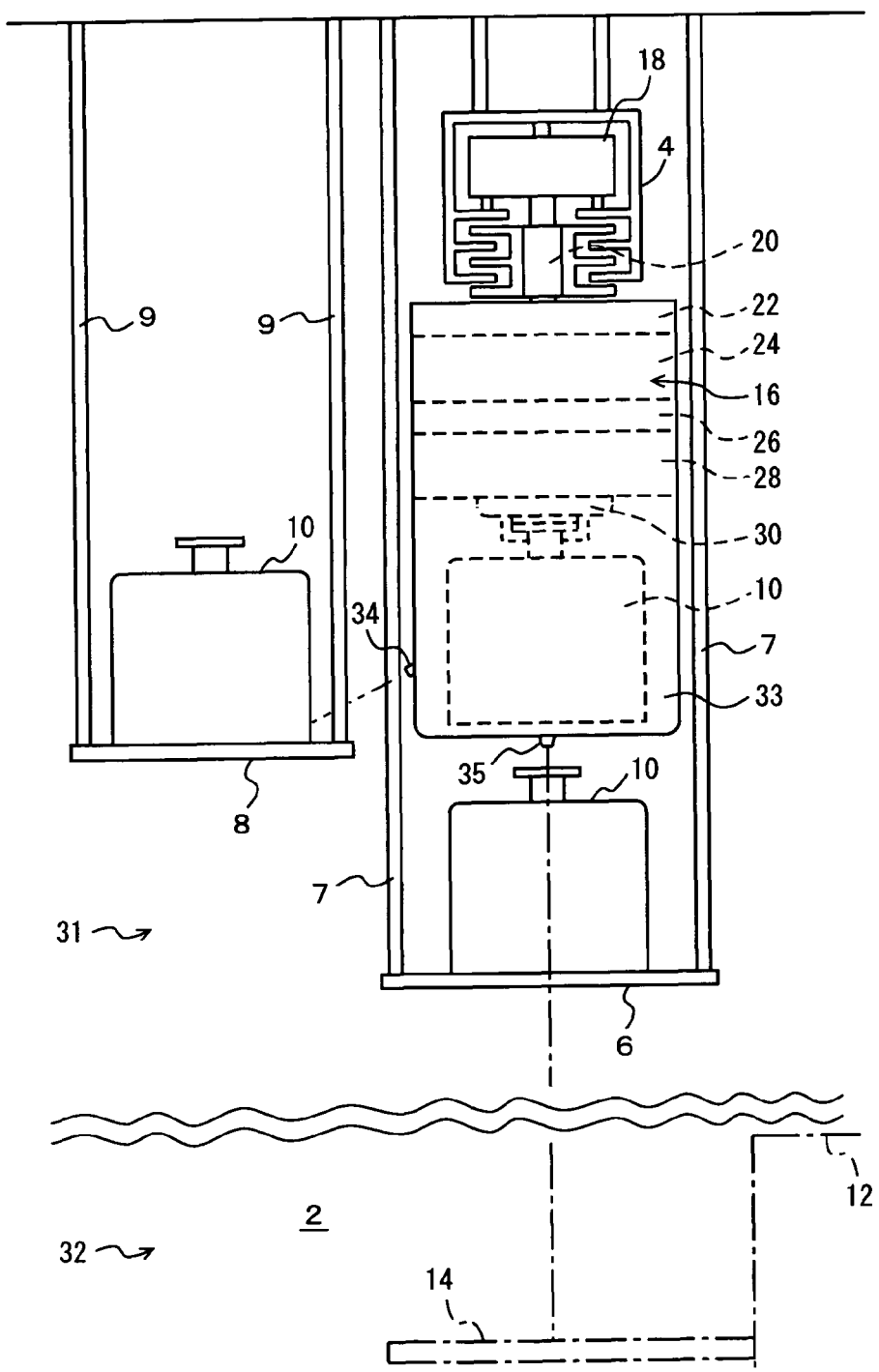
FIG. 1 is a front view showing main components of an overhead traveling vehicle system according to an embodiment.

| Brief Description of the Symbols | |
| --- | --- |
| 2 | Overhead traveling vehicle system |
| 4 | Traveling rail |

-continued

| Brief Description of the Symbols | |
|---|---|
| 6 | Lower buffer |
| 7, 9 | Pillar |
| 8 | Side buffer |
| 10 | Article |
| 12 | Processing apparatus |
| 14 | Load port |
| 16 | Overhead traveling vehicle |
| 18 | Traveling part |
| 20 | Power receiving communication unit |
| 22 | Body frame |
| 24 | Lateral feeding unit |
| 26 | θ drive |
| 28 | Elevation drive unit |
| 30 | Hoisting frame |
| 31 | Overhead space |
| 32 | Ground space |
| 33 | Fall prevention cover |
| 34, 35 | Article sensor |
| 36 | Ball screw |
| 37 | Ball screw drive unit |
| 38 | Endless belt |
| 40, 42 | Fixing unit |
| 44 | Frame |
| 46 | Traveling rail |
| 48 | Overhead traveling vehicle |
| 49 | Short cut |
| 50, 51 | Side buffer |
| 52a to 52d | Transmission unit |
| 54 | Controller |
| 56 | Memory unit |

EMBODIMENTS

Hereinafter, embodiments in the most preferred form for carrying out the present invention will be described.

Embodiments will be described with reference to FIGS. 1 to 4. In the embodiments, the same constituent elements are labeled with the same reference numeral. In an overhead traveling vehicle system 2 in FIGS. 1 and 2, a reference numeral 4 denotes a traveling rail provided near a ceiling of a clean room or the like. A lower buffer 6 is provided under the traveling rail 4, and a side buffer 8 is provided on a side of the traveling rail 4. Reference numeral 7 denotes pillars of the lower buffer 6, and reference numeral 9 denotes pillars of the side buffer 8. Reference numeral 10 denotes an article which are in the middle of transportation by an overhead traveling vehicle 16. For example, the article 10 is a cassette containing a semiconductor substrate. A reference numeral 12 denotes a processing apparatus for semiconductors or the like, and a reference numeral 14 denotes a load port for the processing apparatus 12.

The overhead traveling vehicle 16 has a traveling part 18 which travels inside the traveling rail 4, and a power receiving communication unit 20 for receiving electrical power from the traveling rail 4 in a non-contact manner and communicating with other components utilizing a feeder line or the like. A reference numeral 22 denotes a body frame, a reference numeral 24 denotes a lateral feeding unit, a reference numeral 26 denotes a θ drive, a reference numeral 28 denotes an elevation drive unit, and a reference numeral 30 denotes a hoisting frame. The lateral feeding unit 24 feeds the θ drive 26, the elevation drive unit 28, and the hoisting frame 30 together in a direction perpendicular to the traveling direction of the traveling rail 4. The θ drive 26 rotates the elevation drive unit 28 and the hoisting frame 30 within a predetermined range of angle. The elevation drive unit 28 elevates and lowers the hoisting frame 30 by winding/unwinding a suspension member such as a wire, a rope, and a belt. The hoisting frame 30 is provided with a chuck for holding/releasing the article 10 freely.

The lateral feeding unit 24 laterally feeds the elevation drive unit 28 or the like, and then, the hoisting frame 30 is elevated and lowered slightly, to transfer the article to/from the side buffer 8. The elevation drive unit 28 elevates and lowers the hoisting frame 30 to transfer the article to/from the lower buffer 6 or the load port 14. Further, the lateral feeding unit 24 may laterally feed the elevation drive unit 28 and so on to adjust the article position between the lower buffer 6 or the load port 14 and the overhead traveling vehicle. The lateral feeding unit 24 may be capable of laterally feeding the θ drive 26, the elevation drive unit 28, and the hoisting frame 30 on both left and right sides of the traveling rail 4. Alternatively, the lateral feeding unit 24 may be capable of laterally feeding the θ drive 26, the elevation drive unit 28, and the hoisting frame 30 only on one side of the traveling rail 4. The θ drive 26 is used for adjusting the orientation of the article 10 so that the article 10 can be fitted to kinematic pins or the like provided at the buffers 6, 8 and the load port 14. The θ drive 26 may not be provided. A reference numeral 33 denotes a fall prevention cover. For example, a pair of fall prevention covers 33 are provided on the front and back sides in the traveling direction of the overhead traveling vehicle 16, and claws (not shown) are pulled into or pulled out of the fall prevention covers 33 for preventing the article 10 from being dropped undesirably during transportation of the article. The overhead traveling vehicle 16 travels in one direction along the traveling rail 4. For example, the fall prevention cover on the front side is provided with article sensors 34, 35. The article sensor 34 detects whether any article has already been stored on the side buffer 8, and the article sensor 35 detects whether any article has already been stored on the load port 14 or whether any article has already been stored on the lower buffer 6. The article sensors 34, 35 may not be provided.

A reference numeral 31 denotes an overhead space in the clean room or the like. A reference numeral 32 denotes a ground space under the overhead space 31. The lower buffer 6 and the side buffer 8 are racks where the articles are placed. The lower buffer 6 and the side buffer 8 may be provided with ID readers for reading IDs of the articles 10, or color marks for making it easier for the article sensors 34, 35 to detect the presence of articles stored on the lower buffer 6 and the side buffer 8. Additionally, other components such as a communication unit for communicating with the overhead traveling vehicle 16 and a storage unit for storing data regarding the presence of temporarily stored articles and IDs of the stored articles may be provided. Preferably, the height of the lower buffer 6 is determined to be large as long as traveling of the overhead traveling vehicle 16 is not obstructed by the upper surface of the stored article 10. Preferably, the height of the side buffer 8 is determined such that the height of the stored article 10 is slightly lower than the height of the article which is being transported by the overhead traveling vehicle 16 by, e.g., about 3 cm to 30 cm. Further, the position of the lower buffer 6 is determined such that the lower buffer 6 does not contact the upper part of the load port 14 for preventing obstruction to transfer of the article 10 between the load port 14 and the overhead traveling vehicle 16.

Figure 2:
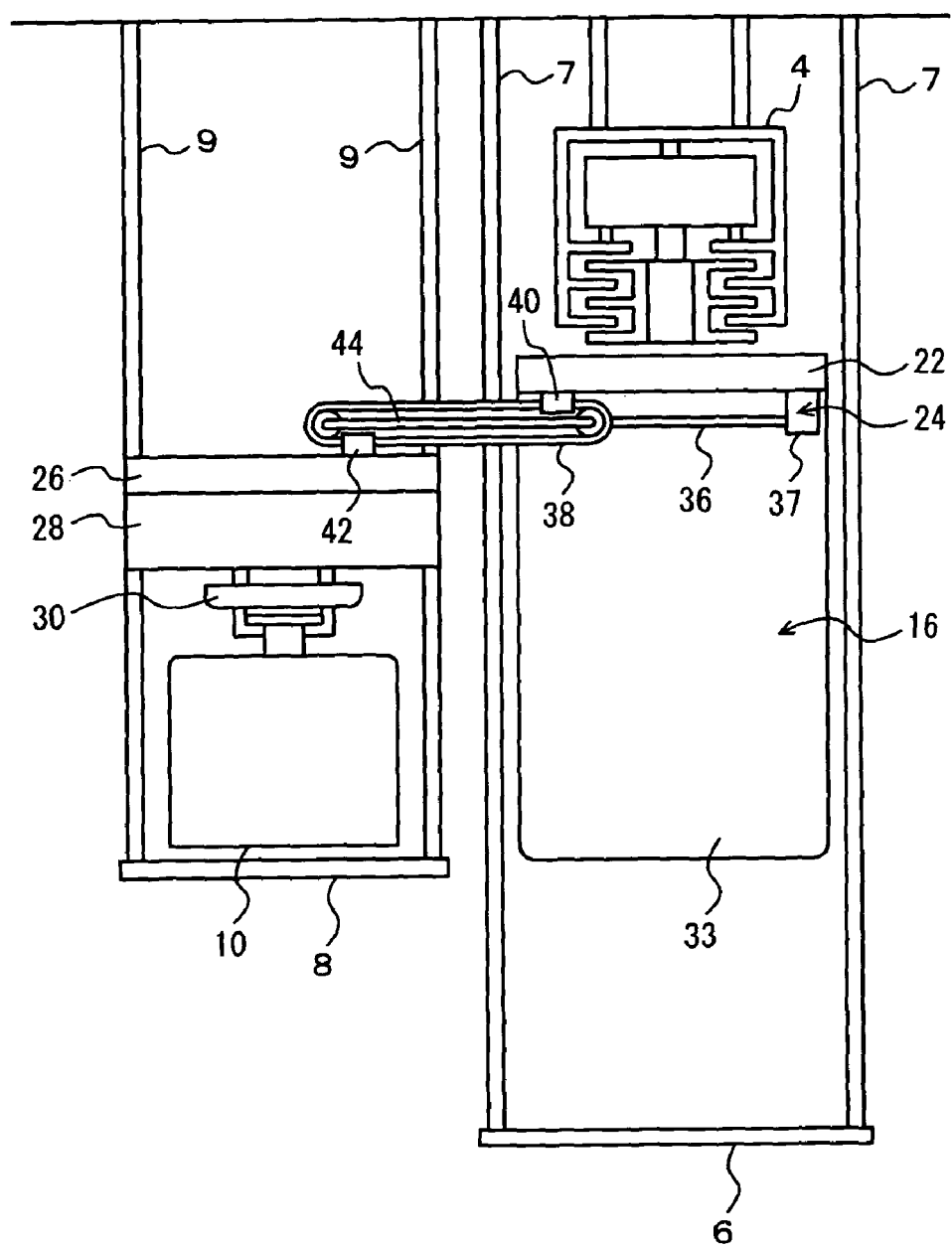
FIG. 2 is a front view showing a state in which an article is transferred between an overhead traveling vehicle and a side buffer, and a fall prevention cover of the overhead traveling vehicle is removed.

FIG. 2 is a view showing a state in which the article 10 is transferred between the overhead traveling vehicle 16 and the side buffer 8. In FIG. 2, the fall prevention cover on the front side in the traveling direction is removed, and the structure of the lateral feeding unit 24 is visible. A reference numeral 36 denotes a ball screw, a reference numeral 37 denotes a ball screw drive unit, and a reference numeral 38 denotes an endless belt. The belt 38 is fixed to the body frame 22 by a fixing unit 40, and fixed to the θ drive 26 by a fixing unit 42. A pulley of the belt 38 is attached to a frame 44, and the frame 44 moves horizontally by the ball screw 36. As a result, when the ball screw 36 is driven to move the frame 44 laterally, the fixing unit 42 is fed laterally. The stroke of the fixing unit 42 is twice as long as the stroke of the frame 44. Thus, the article 10 can be fed laterally between a lower position of the main body frame 22 and an upper position of the side buffer 8. In transferring the article 10 to/from the side buffer 8, the hoisting frame 30 should be elevated and lowered by the elevation drive unit 28. The mechanism for lateral feeding may be embodied by other types of double speed mechanisms, and the lateral feeding mechanism can be designed arbitrarily.

Figure 3:
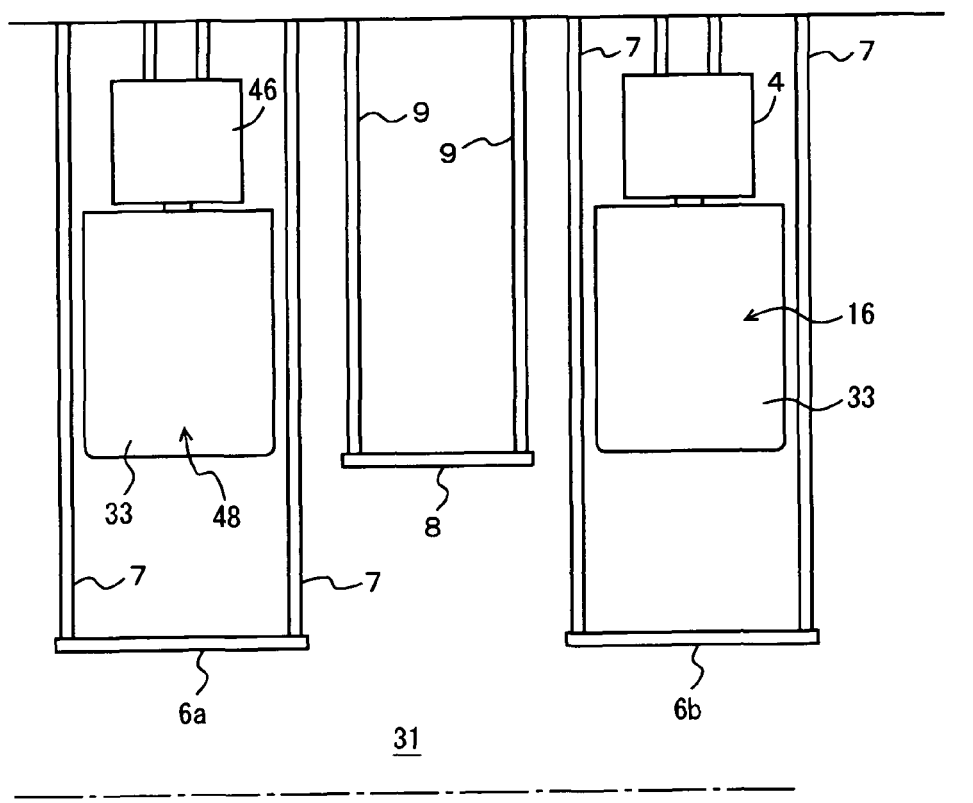
FIG. 3 is a view showing an embodiment in which traveling rails of the overhead traveling vehicle are provided in parallel.
Figure 3:
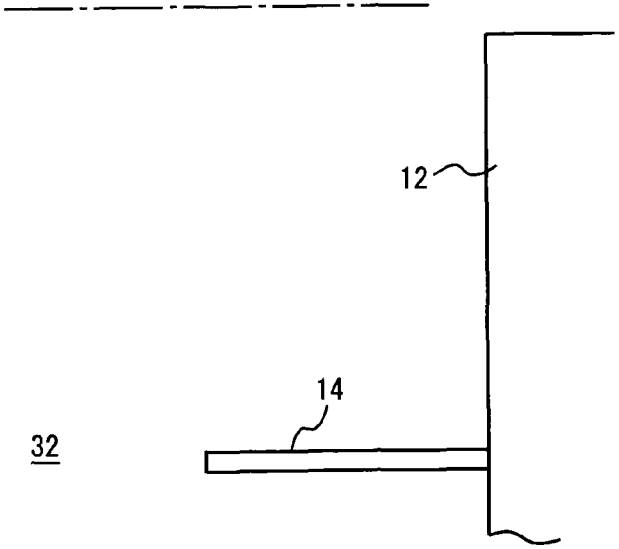

FIG. 3 shows an embodiment in which a bypass traveling rail 46 is provided. An article is transferred between an overhead traveling vehicle 48 traveling along the traveling rail 46 and the side buffer 8 on the right side. Further, the article is transferred between the overhead traveling vehicle 48 and a lower buffer 6a under the traveling rail 46. The article is also transferred between the overhead traveling vehicle 16 and the side buffer 8 on the left side, a lower buffer 6b, and the load port 14. The overhead traveling vehicle 48 and the overhead traveling vehicle 16 are operated in the same manner in other respects. In the embodiment shown in FIG. 3, the overhead traveling vehicle 16 carries out transportation of the article to/from the load port 14, the side buffer 8, or the like, and the overhead traveling vehicle 48 carries out transportation of the article to/from the side buffer 8, and transportation of the article between a transportation departure point and a transportation destination point (not shown). As a result, the overhead traveling vehicle 48 can transport the article regardless of the state of the load port 14. The overhead traveling vehicle 16 transfers the article transported by the overhead traveling vehicle 48 to/from the load port 14 utilizing the side buffer 8 and the lower buffer 6b. The overhead traveling vehicle 16 itself can be used for intra-bay transportation or inter-bay transportation of the article. The traveling rails may be arranged in three or more lanes in parallel.

Figure 4:
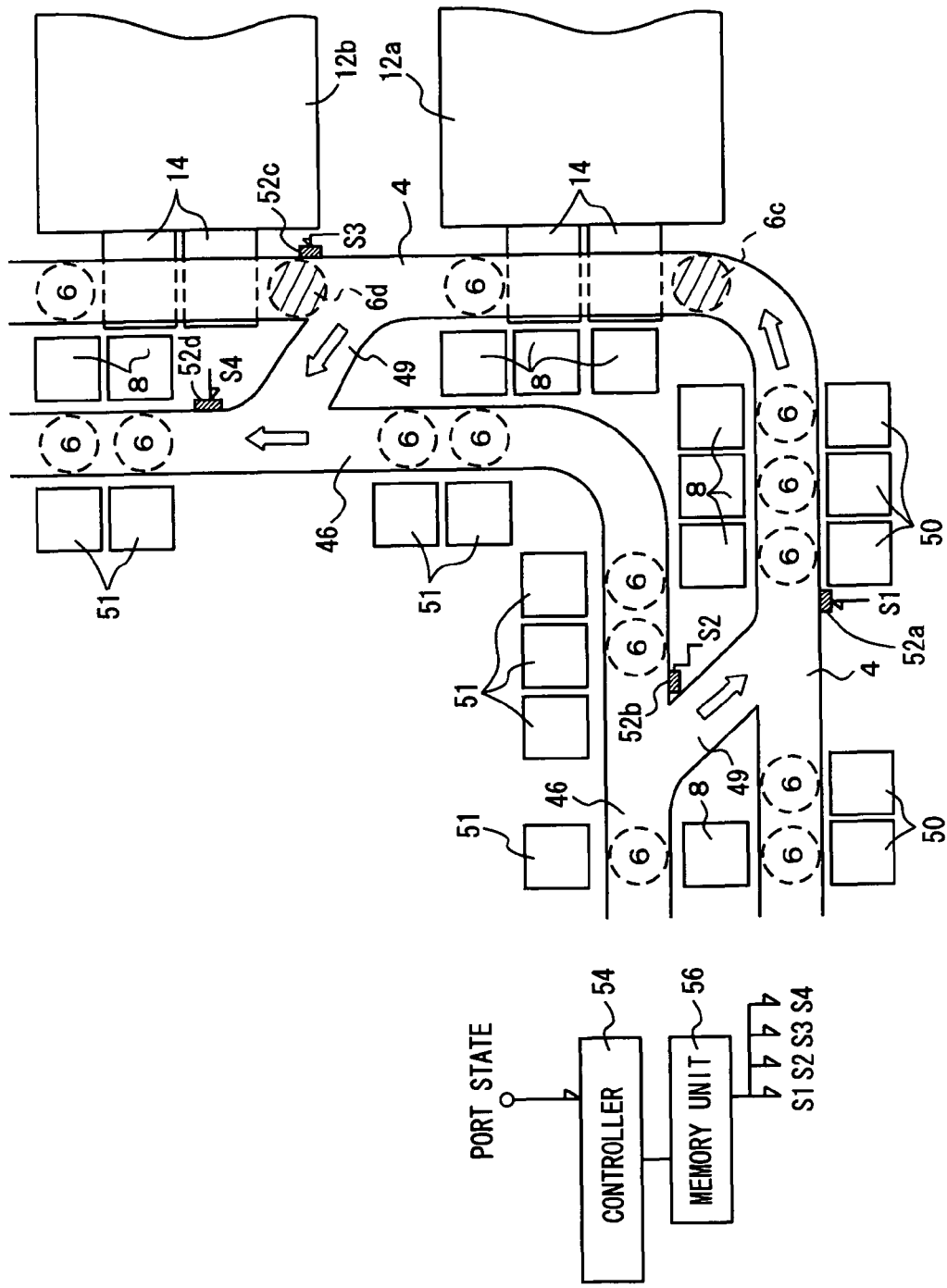
FIG. 4 is a plan view showing the layout of the traveling rails and lower and side buffers in the embodiment.

FIG. 4 shows an example of an overhead traveling vehicle system in which the traveling rail 4 as a main line and the traveling line 46 as a bypass line are provided in parallel. In the example, an overhead traveling vehicle (not shown) is capable of laterally feeding the article toward both of the left side and the right side of the traveling rail. Reference numerals 50, 51 denote additional side buffers, and the side buffers 8 are provided between the traveling rails 4, 46. The lower buffers 6 are provided in the overhead space under the traveling rails 4, 46. A lower buffer 6c is used when it is not possible to unload the article on a load port 14 for a processing apparatus 12a. Similarly, a lower buffer 6d is used when it is not possible to unload the article on a load port for a processing apparatus 12b. When it is not possible to unload the article on a load port 14, a side buffer facing the load port 14 may be used additionally. Arrows in FIG. 4 denote traveling directions of the overhead traveling vehicle. The traveling rails 4, 46 are connected by short cuts 49.

Reference numerals 52a to 52d denote transmission units for transmitting (outputting) data, regarding the states of the buffers 6, 8, 50, 51 and the states of the load ports 14, to the overhead traveling vehicle. For example, an RFID is provided for each of the transmission units 52a to 52d, and the overhead traveling vehicle is provided with an RFID reader for reading RFID data. Further, the transmission units 52a to 52d transmit stop data such as a stop position, a lateral feeding distance, elevating and lowering distances, and an angular angle of the θ drive for transfer of the article to the load ports 14 or the side buffers 6, 8, 50, 51. As the transmission units 52a to 52d, arbitral communication means capable of transmitting data to the overhead traveling vehicle can be used. Further, in the embodiment, the processing apparatuses 12a, 12b utilize a LAN established by the feeder line or the like provided along the traveling rail for communication with the overhead traveling vehicle system, and outputs data such as the states of the load ports 14, and the IDs of the articles on the load ports to the LAN. Each of the communication units 52a to 52d has a communication range covering buffers and load ports from its position to an upstream position of the next transmission unit on the downstream side.

A controller 54 controls the overhead traveling vehicle system. The data regarding the states of the respective load ports is inputted from a production controller (not shown). Alternatively, the data regarding the states of the load ports outputted to the LAN along the traveling rail 4 from the processing apparatuses 12a, 12b may be received. A memory unit 56 stores data regarding the states of the buffers 6, 8, 50, 51 and the load ports 14. The data includes information about whether each of the side buffers and the load ports is vacant or occupied by an article, and if occupied, further includes information such as an ID and a transportation destination point of the article. Further, by write signals S1 to S4 for writing data from the memory unit 56 in the transmission units 52a to 52d, the data regarding the buffers and the load ports is written in the transmission units 52a to 52d. The data regarding the load ports 14 may be written directly by the processing apparatuses 12a, 12b, and alternatively, may not be written in the transmission units 52a to 52d.

Operation in the embodiment shown in FIG. 4 will be described. The overhead traveling vehicle traveling along the traveling rail 46 temporarily places the article on the lower buffer 6, the side buffer 8, or the side buffer 51 or loads the temporarily placed article for transporting it to the next transportation destination point. The overhead traveling vehicle traveling along the traveling rail 4 utilizes the lower buffer 6, the side buffer 8, or the side buffer 50 for transfer or transportation of the article. The stop data to the load ports 14 or the buffers 6, 8, 50, 51 can be read by the transmission units 52a to 52d. Further, the presence of the article in these ports or buffers can be confirmed by the transmission units 52a to 52d. For the purpose of simplifying the stop data, the side buffer facing the load port 14 should be able to be stopped by adding a predetermined correction value to the stop data for the load port 14. The correction data is written in the transmission units 52a to 52d. If the load ports 14 for the processing apparatus 12a are occupied, the overhead traveling vehicle recognizes the state of the load ports 14 by the transmission unit 52a, and unloads the article on the lower buffer 6c. Likewise, if the load ports 14 for the processing apparatus 12b are occupied, the overhead traveling vehicle unloads the article on the lower buffer 6d.

The overhead traveling vehicle which has been traveled along the traveling rail 4 or traveling rail 46 reads a state of a predetermined unloading point by the transmission units 52a to 52d. If it is not possible to unload the article on the unloading point in the transportation command, for example, the information to this effect is transmitted to the controller 54 to designate a substitute unloading point. Since the controller 54 knows the states of the respective buffers or the load ports from the data stored in the memory unit 56, it is possible to designate a substitute buffer. In particular, the lower buffer 6c on the upstream side of the processing apparatus 12a or the lower buffer 6d on the downstream side of the processing apparatus 12b may be utilized for temporarily placing the transported article, assigning a new transportation command from the controller 54, and transporting the article stored in the load port 14 to the designated transportation destination point. The article temporarily placed on the lower buffer 6c or the lower buffer 6d is transported by the subsequent overhead traveling vehicle after the load port at the transportation destination point becomes empty. The article may be temporarily placed on the side buffer 8. However, in the case of using the lower buffer 6c or 6d, it is possible to temporarily place the article simply by elevating and lowering the hoisting frame. In contrast, in the case of using the side buffer 8, after laterally feeding the elevation drive unit or the like by the lateral feeding unit, it is necessary to elevate and lower the hoisting frame. Therefore, the time required for temporal placement is long.

In the embodiment, the transmission units 52a to 52d are used for notifying the states of the respective buffers and load ports to the overhead traveling vehicle. Alternatively, the overhead traveling vehicle may recognize the states of the buffers and the load ports by the article sensors. Further, instead of using this type of sensors, the overhead traveling vehicle may recognize the state of occupancy in the load port in the transportation destination point, at the upper part of the load port, move backwardly in the reverse direction, and temporarily place the article on the lower buffer 6c or 6d.

In the embodiments, the following advantages can be obtained.

(1) Since the buffers 6, 8 or the like can be provided, e.g., under, and on the sides of the traveling rails 4, 46, it is possible to improve the storage capacity for the articles.

(2) By improving the storage capacity for the articles, stockers for temporal storage of the articles become unnecessary, or it is possible to reduce the number of the stockers. Further, at the time of assigning the transportation command, even if the load port at the transportation destination point is occupied, it is possible to utilize any of the buffers around the load port. Thus, it is possible to issue the transportation command without significantly considering the state of the load point. Further, for example, by storing the article to be transported to the loading point in the buffer around the load port, improvement in the transportation efficiency is achieved. Accordingly, the direct long distance transportation between the load ports through an inter-bay route becomes easy.

(3) By providing the bypass traveling rail 46, and providing the side buffer 8 for common use between the traveling rail 4 and the traveling rail 46, it is possible to transport the article efficiently.

(4) Even if the load port at the transportation destination point is occupied, the article can be placed temporarily on the lower buffer 6c or the lower buffer 6d on the upstream side of the load port, and the article on the occupied load port can be transported to the next transportation destination point.

(5) By providing the transmission units 52a to 52d, the overhead traveling vehicle can easily recognize the stop data at the respective buffers and load ports or the states of the buffers.

The invention claimed is:

1. An overhead traveling vehicle system, comprising:
a traveling rail for an overhead traveling vehicle in an overhead space, said traveling rail including a first rail and a second rail connected by a plurality of shortcuts, said first rail and second rail being parallel to each other;
a load port for a processing apparatus in a ground space only under the first rail, the overhead traveling vehicle having an elevation drive unit which elevates and lowers a hoisting frame for transferring an article stored on the hoisting frame;
a first article rack in the overhead space under the first rail and suspended from a ceiling;
a second article rack in the overhead space between the first rail and the second rail and suspended from the ceiling; and
lateral feeding means for laterally feeding the elevation drive unit and the hoisting frame to the side of traveling rail, said lateral feeding means being in the overhead traveling vehicle,
wherein the article is transferred between the hoisting frame and the first article rack by elevating and lowering the hoisting frame,
wherein the article is transferred between the hoisting frame and the second article rack by laterally feeding, elevating and lowering the hoisting frame, and
wherein said second article rack is configured such that the overhead traveling vehicle can transfer the article to said second article rack while traveling on said first rail or said second rail, such that the article can be passed from a first overhead traveling vehicle traveling on said first rail to a second overhead traveling vehicle traveling on said second rail via said second article rack.

2. The overhead traveling vehicle system of claim 1, wherein the first article rack is disposed under the first rail at a position not corresponding to the load port.

3. The overhead traveling vehicle system of claim 2,
wherein an article which cannot be unloaded on the load port is temporarily placed on the first article rack on an upstream side of the load port, and
wherein said system further comprises
a memory unit which memorizes a position of the temporarily placed article, and
a controller which controls a subsequent overhead traveling vehicle to transport the article on the first article rack to the load port when unloading of the article on the load port becomes possible.

4. The overhead traveling vehicle system of claim 1, wherein the overhead traveling vehicle further comprises a first sensor for detecting a previously stored article on the first article rack, and a second sensor for detecting a previously stored article on the second article rack.

5. The overhead traveling vehicle system of claim 1, further comprising:
a transmission unit for rewritably outputting states of the first and second article racks, along the traveling rail; and
a reader for reading the output from the transmission unit, in the overhead traveling vehicle.

* * * * *